United States Patent
Shanmugalingam et al.

(10) Patent No.: US 9,979,633 B2
(45) Date of Patent: May 22, 2018

(54) METHOD OF CONTROL BY ANTICIPATION OF THE DATA STREAMS BY AN SDN NETWORK IN CASE OF FAILURE OF A ROUTER

(71) Applicant: Orange, Paris (FR)

(72) Inventors: Sivasothy Shanmugalingam, Rennes (FR); Philippe Bertin, Acigne (FR)

(73) Assignee: ORANGE, Paris (FR)

( * ) Notice: Subject to any disclaimer, the term of this patent is extended or adjusted under 35 U.S.C. 154(b) by 0 days. days.

(21) Appl. No.: 15/118,751

(22) PCT Filed: Feb. 9, 2015

(86) PCT No.: PCT/FR2015/050304
§ 371 (c)(1),
(2) Date: Aug. 12, 2016

(87) PCT Pub. No.: WO2015/121572
PCT Pub. Date: Aug. 20, 2015

(65) Prior Publication Data
US 2017/0048137 A1    Feb. 16, 2017

(30) Foreign Application Priority Data
Feb. 12, 2014  (FR) ..................... 14 51069

(51) Int. Cl.
*G01R 31/08* (2006.01)
*H04L 12/703* (2013.01)
(Continued)

(52) U.S. Cl.
CPC .............. *H04L 45/28* (2013.01); *H04L 45/64* (2013.01); *H04W 24/04* (2013.01); *H04W 76/022* (2013.01)

(58) Field of Classification Search
CPC ........ H04L 45/28; H04L 45/64; H04W 24/04; H04W 76/022
See application file for complete search history.

(56) References Cited

U.S. PATENT DOCUMENTS 7,248,560 B1 * 7/2007 Blankenship ........... H04L 45/00
                                                    370/219
8,804,494 B1 * 8/2014 Uberoy ............... H04L 41/0663
                                                    370/219
(Continued)

FOREIGN PATENT DOCUMENTS

WO      0205068 A2     1/2002
WO   2008076201 A1     6/2008

OTHER PUBLICATIONS

J. Kempf et al. entitled "Moving the Mobile Evolved Packet Core to the Cloud", 5th International Workshop on Selected Topics in Mobile and Wireless Computing, 2012.
(Continued)

*Primary Examiner* — Kevin Mew
(74) *Attorney, Agent, or Firm* — David D. Brush; Westman Champlin & Koehler, P.A.

(57) ABSTRACT

A method is provided to control an IP core network, including first and second routers connected to an external data packet network and switches able to connect to a base station of a network for access to the first and second routers. The data packet network is able to send data streams through the IP core network destined for the terminals attached to the base station, at least one data stream currently being conveyed between the external network and at least one terminal. The method includes: establishing a rule for processing a stream by the first router, assigning the second router as backup router for the first router; transmitting to the external data packet network information relating to the assigning of the backup router; detecting an event relating to a failure of
(Continued)

Figure 1:
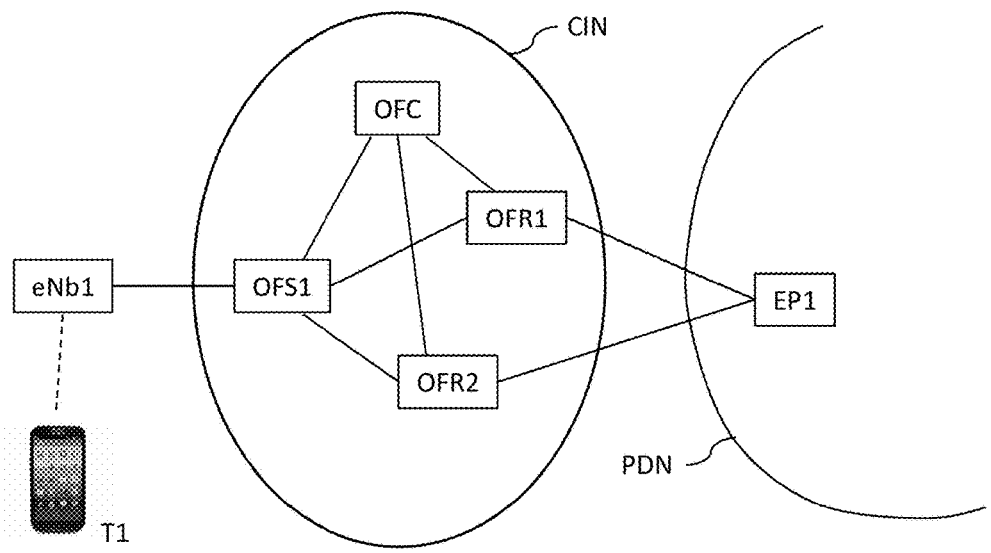

the first router; and transmitting to the backup router an established processing rule to be applied.

11 Claims, 2 Drawing Sheets

(51) Int. Cl.
*H04L 12/715* (2013.01)
*H04W 24/04* (2009.01)
*H04W 76/02* (2009.01)

(56) References Cited

U.S. PATENT DOCUMENTS

| | | | |
|---|---|---|---|
| 2006/0153067 A1 | 7/2006 | Vazzeur et al. | |
| 2010/0061226 A1* | 3/2010 | Morishige | H04L 12/66 370/216 |
| 2010/0220656 A1* | 9/2010 | Ramankutty | H04L 45/025 370/328 |
| 2010/0220736 A1 | 9/2010 | Mahapatra et al. | |
| 2010/0299451 A1* | 11/2010 | Yigang | H04L 45/306 709/241 |
| 2012/0134257 A1* | 5/2012 | Knox | H04W 28/08 370/218 |
| 2012/0158872 A1* | 6/2012 | McNamee | H04L 69/40 709/206 |
| 2013/0016606 A1* | 1/2013 | Cirkovic | H04L 43/0811 370/225 |
| 2013/0343176 A1 | 12/2013 | Bashandy | |
| 2013/0346585 A1* | 12/2013 | Ueno | H04L 45/02 709/223 |
| 2014/0105030 A1* | 4/2014 | Kogan | H04W 24/04 370/242 |
| 2014/0122946 A1* | 5/2014 | Berg | H04L 29/08972 714/57 |
| 2016/0212038 A1* | 7/2016 | Musiol | H04L 45/28 |

OTHER PUBLICATIONS

International Search Report dated Mar. 13, 2015 for corresponding International Application No. PCT/FR2015/050304, filed Feb. 9, 2015.
Jin X et al., "SoftCell: Taking Control of Cellular Core Networks" Internet Citation, May 15, 2013 (May 15, 2013), pp. 1-14, XP002719715.
English translation of the International Written Opinion dated Mar. 13, 2015 for corresponding International Application No. PCT/FR2015/050304, filed Feb. 9, 2015.
Katz et al., Bidirectional Forwarding Detection (BFD), Internet Engineering Task form (IETF) RFC 5880, Jun. 2010.
McPherson et al., "BGP Multi-Exit-Disc (MED) Considerations", Network Working Group, RFC 4451, Mar. 2006.

* cited by examiner

METHOD OF CONTROL BY ANTICIPATION OF THE DATA STREAMS BY AN SDN NETWORK IN CASE OF FAILURE OF A ROUTER

1. CROSS-REFERENCE TO RELATED APPLICATIONS

This Application is a Section 371 National Stage Application of International Application No. PCT/FR2015/050304, filed Feb. 9, 2015, the content of which is incorporated herein by reference in its entirety, and published as WO 2015/121572 on Aug. 20, 2015, not in English.

2. FIELD OF THE INVENTION

The invention relates to the general field of telecommunications and more particularly concerns an IP (Internet Protocol) core network architecture. The invention thus applies in a preferred but not limited way to communication networks conforming to the LTE (Long Term Evolution) standard defined by the 3GPP (Third Generation Partnership Project) standardization consortium, and more specifically to the architecture of an LTE/EPC (Evolved Packet Core) core network.

3. PRIOR ART

An exponential increase in mobile telecommunications traffic is expected in the next few years, boosted by the emergence of new applications, new terminals and increasingly higher communication rates.

In this context, the LTE/EPC architecture has been defined by the 3GPP consortium for providing transparent IP connectivity between a user terminal, otherwise known as User Equipment (or UE), and Packet Data Networks (or PDNs) capable of offering this terminal various communication services, such as Voice over IP or VoIP services, data downloading, videos on demand, etc. This architecture is based on:

- an access network (or E-UTRAN for "Evolved-Universal Terrestrial Radio Access Network") to which the user terminal is connected via a base station known as "eNodeB" (eNB); and
- an IP (or EPC) core network managing the data exchanges, on uplinks and downlinks, between this terminal and the packet data networks to which it is connected.

The LTE/EPC architecture as it is currently defined by the 3GPP consortium is not actually optimized and makes it difficult for core IP network operators to integrate new services.

More precisely, this architecture at present relies on the GTP protocol (GPRS Tunneling Protocol) for managing terminal mobility within the network.

It should be noted that separate GTP communication tunnels are established for the different types of traffic exchanged in the network (i.e. for each quality of service), and more specifically, for each PDP (Packet Data Protocol) communication session managed by the core network. The GTP communication protocol therefore contributes not only to terminal mobility management but also to quality of service management in the network.

The GTP protocol is used above the transport protocol implemented in the network, i.e. typically above the UDP protocol (User Data Protocol) or optionally the TCP protocol (Transmission Control Protocol), which itself is executed above the IP protocol (Internet Protocol). The use of the GTP protocol thus results in the addition of multiple headers (i.e. GTP, UDP/TCP and IP headers) to each data packet passing through the core network, which significantly increases the proportion of header data in relation to the "useful" data exchanged between the different equipment in the network for managing terminal mobility and the quality of service of communications.

The document by J. Kempf et al. entitled "Moving the Mobile Evolved Packet Core to the Cloud", 5th International Workshop on Selected Topics in Mobile and Wireless Computing, 2012, proposes an evolution of the LTE/EPC core network architecture defined by the 3GPP consortium in which the data and control planes are separate, and which uses the network principle defined by software commonly known as SDN for "Software-Defined Networking". In a known way, an SDN network architecture is used to decouple the control and data planes by centralizing network intelligence (i.e. the network control functions) in a software control device. The behavior of the network equipment is then defined by rules received from the control device, such as the rules for processing or transferring data (i.e. the traffic). The SDN concept may rely on the OpenFlow™ communication protocol defined by the ONF (Open Networking Foundation), which can be used for simplified programming of the network equipment, via a standard interface.

In order to reduce the signaling induced by the establishment of GTP communication tunnels between network entities, the inventors have proposed applying the SDN concept and the OpenFlow protocol to the core IP network by replacing the core IP network equipment such as the service gateways (SGW) or the PDN network gateways (PGW, packet data network gateways) with OpenFlow switches and OpenFlow routers, and by adding an OpenFlow control entity responsible for establishing the data plane. Each router is connected to one or more switches, the routers are connected to the PDN network, and the switches are connected to the base stations eNB. These routers and these switches are programmable via processing rules defined by the OpenFlow control entity and updated according to the current topology of the network. For updating the network topology information used by the OpenFlow control entity defining the rules for processing, a communication interface is defined between the OpenFlow control entity and a pre-existing entity called MME (Mobility Management Entity), responsible for mobility management. This interface provides notably for the transmission by the mobility management entity MME to the OpenFlow control entity of information relating to the status of terminals served by the base stations eNB which are connected to the mobility management entity MME.

When a failure affects an OpenFlow router connected to the PDN network, the PDN network determines a backup entry router in the core IP network for receiving the data streams destined for terminals attached to the base stations connected to the core IP network, also known as downstreams. These streams do not correspond to the entries in the routing tables of the backup router, i.e. to its processing rules. This causes a large number of requests from the backup router which does not know what to do with them, to the OpenFlow control entity. Because of the overloading of the control entity and processing times, the control entity and/or the second router may drop out, and the communication sessions carried by these streams may be interrupted.

One of the purposes of the invention is to overcome these drawbacks of the prior art.

4. DISCLOSURE OF THE INVENTION

The invention will improve the situation by using a method of control of an IP core network, said IP core network including at least one first and one second router connected to an external packet data network and a plurality of switches capable of connecting at least one base station of a network for access to the first and second routers, said packet data network being capable of transmitting data streams through the IP core network destined for terminals attached to the at least one base station, at least one data stream currently being routed between the external network and at least one terminal, the method including at least one step for establishing a rule for processing one of said at least one streams by the first router, as well as the following steps:
- a step of assigning the second router as backup router for the first router;
- a step of transmitting to the external packet data network an item of information relating to said assignment of the backup router;
- a step of detecting an event relating to a failure of the first router;
- a step of transmitting to the backup router at least one of the established processing rules, intended to be applied by the backup router.

According to the prior art, the stream processing rules are not established in a second router at the time when it receives the streams initially destined to be routed through a first router. Not knowing what to do with these streams, the second router must inspect each of the streams and interrogate a controller. For example, according to the OpenFlow standard, the second router uses the first detected packet of an unknown stream, encapsulates it in an OpenFlow packet called "PacketIn" and sends it to the controller; the controller decapsulates the packet, identifies the stream, develops the processing rule (i.e. a routing rule), re-encapsulates the packet in an OpenFlow packet called "PacketOut" also including said rule, and returns the packet to the second router. Then the second router applies this rule for all packets of the same stream, without seeking the controller. If there is a large number of streams, the second router must seek the controller a large number of times with a "PacketIn PacketOut" exchange, which poses a problem of resource consumption for the controller and the second router.

The problem caused by the reception of unexpected data streams by a second backup router of a failed first router is resolved thanks to the method of control according to the invention which is novel and inventive.

Indeed according to the invention, when the first router is no longer able to receive the data streams from the external (PDN) network, the method of control according to the invention anticipates the reaction of this PDN network. Although it is managed independently of the IP core network, the PDN network obtains an item of information according to which the second router may be used as a replacement for the first in the event of a problem. The control entity of the IP core network, e.g. an Open Flow controller, may therefore update the topology and the stream processing rules without waiting for the second router to receive said streams from the PDN network. The processing rules of the second router are therefore updated in order that the second router, to which the PDN network transmits the streams rather than to the first router, may immediately process the streams appropriately.

The step of assigning the backup router makes it possible to predict in advance which router will take the place of the first router in the event of failure of the first.

The step of transmitting to the PDN network, an item of information relating to this assignment, makes it possible to indicate to the PDN network, before a failure of the first router occurs, that the IP core network would prefer that the streams via the PDN network are rerouted onto the backup router, i.e. the second router, rather than another router of the IP core network.

The step of detecting a failure makes it possible to determine from what moment the backup router is likely to receive the streams so far received by the first router, and incidentally enables the controller to update the topology of the IP core network. The assumption is that in parallel the PDN network detects the same failure, which will have the effect of redirecting the streams initially directed to the first router to the second router, since at this stage the PDN network is already informed of the IP core network preference.

Finally, the step of transmitting the processing rules to the backup router makes it possible to activate, before the arrival of these streams in this router or at the same moment, the rules for processing these streams so that they are routed up to the terminals for which they are destined, in a transparent manner for the terminals and without interrupting the communication sessions carrying the data streams.

Clearly thanks to the invention, the controller transmits to the second router, i.e. the backup router, the processing rules already determined, thereby avoiding being excessively sought by the second router when a failure of the first router occurs, and avoiding the backup router from overly seeking the controller and thus risking interrupting the continuity of the data streams arriving suddenly in large number.

According to one aspect of the invention, the method of control also includes a step of storing said at least one determined rule, the rule remaining stored as long as the at least one corresponding stream is currently being routed; also according to this aspect, the step of transmitting the at least one rule to the backup router includes the stored rules.

Thanks to this aspect, the controller transmits to the second router, i.e. the backup router, the processing rules not only already determined but only those that are in progress, thus avoiding the backup router from receiving unnecessary rules.

According to one aspect of the invention, the step of transmitting the at least one rule to the backup router is triggered by the step of detecting an event relating to a failure of the first router.

Thanks to this aspect, the controller immediately transmits the processing rules to the second router, i.e. the backup router, in a proactive way, thus limiting the loss of data from streams switching from the first to the second router.

According to one aspect of the invention, the at least one step for establishing a rule for processing a stream by the first router includes:
- a step of receiving a request from the first router, including an identifier of a stream;
- a step of determining a processing rule for the stream;
- a step of transmitting a response to the first router, including said rule, and the step of transmitting at least one rule to the backup router includes the transmission of a plurality of said responses.

Thanks to this aspect, the transmission of the processing rules to the backup router is facilitated and accelerated. The stream processing rules for the first router are determined one by one as it receives new streams, using a plurality of requests/responses between the first router and the controller. A response therefore includes the processing rule for one stream. If this stream is received by another router in place of the first router, the same rule is transposable, since in the IP core network the same data stream originating from the PDN network may be routed to the same switch regardless of the router. According to the invention, instead of determining all the processing rules for the backup router one by one as the streams arrive on the backup router, as in the prior art, the controller transmits to it the plurality of responses already transmitted to the first router.

For example, according to the OpenFlow standard, the controller therefore does not need to redetermine the processing rules to be established using PacketIn and PacketOut packets individualized by stream, it is sufficient for it to transmit to the backup router, only once, all the PacketOuts determined for the first router, which optimizes the exchanges between backup router and controller.

According to one aspect of the invention, the step of transmitting an item of information relating to the assignment of the backup router includes the transmission of a first request in conformity with the BGP protocol to the first router, including a first preference parameter, and the transmission of a second request in conformity with the BGP protocol to the second router, including a second preference parameter of lower value than the first.

The BGP requests are used to configure the links between the PDN network and the routers in the IP core network. Thus, thanks to this aspect, i.e. thanks to the BGP requests indicating different preferences for each of the links between the PDN network and the first router on the one hand, and between the PDN network and the second router on the other, the data streams from the PDN network are transmitted by default to the first router, and to the second router when the PDN network detects a problem on the first router. Indeed, a BGP request is transverse between domains and it will be propagated from the domain consisting of the IP core network to the domain consisting of the PDN network. Thus, a BGP router located in the PDN network connected to the two routers in the IP core network will receive the two BGP requests and will know which of the two routers in the IP core network is provided by the IP core network to be the backup for the other, i.e. the one that has a higher preference parameter. The BGP router of the PDN network by default transmits the streams to the protected router, and if it is the victim of a failure detected by the PDN network BGP router, it is to the backup router that the streams will be transmitted.

According to one aspect of the invention, the event relating to a failure of the first router is obtaining an item of information on failure originating from the first router.

Thanks to this aspect, the information arrives as fast as possible at the controller, without passing through an intermediate piece of equipment.

According to one aspect of the invention, the failure information is obtained in a response conforming to the BFD Protocol.

Thanks to this aspect, the failure information is obtained faster than, for example, using the Keepalive response of the BGP protocol. The BFD (Bidirectional Forwarding Detection, RFC 5880) protocol is used to detect a failure between two items of equipment connected by a link, even when the physical medium of this Link does not provide any failure detection mechanism.

According to one aspect of the invention, the event relating to a failure of the first router is obtaining a plurality of requests for stream processing rules originating from the second router.

Thanks to this aspect, when the controller receives from the second router an abnormal number of PacketIn requests concerning streams normally processed by the first router, the controller indirectly detects that a failure has occurred in the first router. This event is an indicator that the streams are directed by the external packet network to the second router instead of the first router, due to a failure of the first router, detected by the external packet network before the controller.

According to one aspect of the invention, establishing the rules for processing data streams is in conformity with the Open Flow protocol.

Thanks to this aspect, the signaling induced by the establishment of communication tunnels between a terminal and the exit point from the IP core network to the PDN network is greatly reduced.

The various aspects of the method of control that have just been described may be implemented independently of each other or in combination with each other.

The invention further concerns a control device capable of implementing the method of control that has just been described, in all its embodiments. This is a device for controlling an IP core network, said IP core network including at least one first and one second router connected to an external packet data network and a plurality of switches capable of connecting at least one base station of a network for access to the first and second routers, said packet data network being capable of transmitting data streams through the IP core network destined for terminals attached to the at least one base station, at least one data stream currently being routed between the external network and at least one terminal, the device including a module (140) for establishing a rule for processing one of said at least one streams by the first router, as well as the following modules:

a module for assigning the second router as backup router for the first router;

a module for transmitting to the external packet data network an item of information relating to said assignment of the backup router;

a module for detecting an event relating to a failure of the first router;

a module for transmitting to the backup router at least one of the established processing rules, intended to be applied by the backup router.

The invention also concerns a controller capable of transmitting intra-domain requests conforming to the OpenFlow protocol, and inter-domain requests, including a control device such as that which has just been described.

Intra-domain requests are requests intended for equipment in the same domain as the controller, i.e. equipment in the IP core network. Inter-domain requests are requests capable of reaching equipment in another domain, e.g. equipment in an external packet network whether or not forming part of an autonomous system different from the IP core network. BGP requests, for example, are inter-domain requests.

The invention also concerns a computer program including instructions for implementing the steps of the method of control that has just been described, when this program is executed by a processor.

The invention finally concerns a recording medium readable by a controller on which the program just described is recorded, which is able to use any programming language, and be in the form of source code, object code, or intermediate code between source code and object code, such as in a partially compiled form, or in any other desirable form.

5. DESCRIPTION OF THE FIGURES

Figure 2:
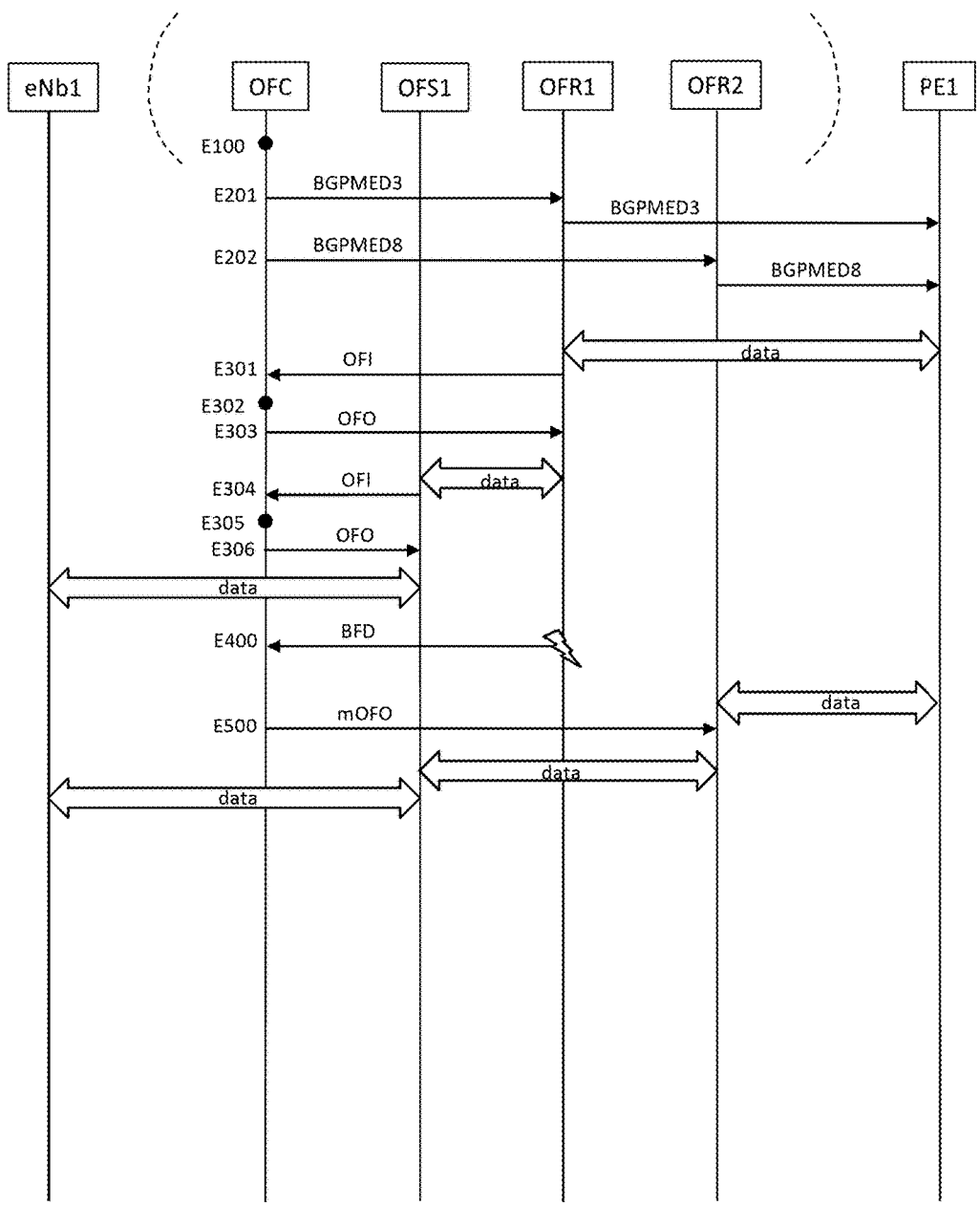

Other advantages and features of the invention will appear more clearly on reading the following description of a particular embodiment of the invention, given as a simple illustrative and non-restrictive example, and the accompanying drawings, in which:

FIG. 1 schematically presents terminals and base stations, an IP core network, a PDN network, and data streams from the PDN network to the terminals, according to one aspect of the invention, FIG. 2 presents an example of implementation of the method of control, according to one embodiment of the invention.

Figure 3:
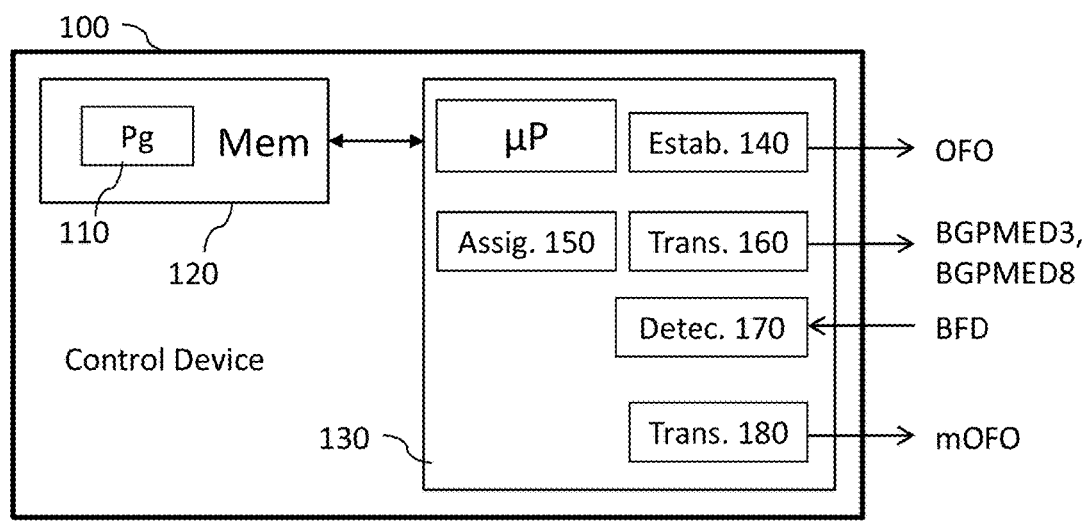

FIG. 3 presents an example of structure of a control device, according to one aspect of the invention.

6. DETAILED DESCRIPTION OF AT LEAST ONE EMBODIMENT OF THE INVENTION

The rest of the description presents examples of several embodiments of the invention based on the IETF and Open Flow standards, but the invention equally applies to any type of programmable network based on the SDN concept.

FIG. 1 schematically presents terminals and base stations, an IP core network, a PDN network, and data streams from the PDN network to the terminals, according to one aspect of the invention.

The IP core network, CIN, is located between the base stations serving the mobile terminals and an external packet data network, PDN, such as, for example, the Internet network. The network CIN includes routers such as OFR1 and OFR2 and switches such as OFS1 connected between them. A single switch is illustrated for simplicity, but multiple interconnected switches may be located between a router and a base station. The switches are therefore connected to base stations such as eNb1, to which terminals such as T1 are attached, and the routers are connected to routers in the PDN network such as EP1. A router in the PDN network is in conformity with the BGP Protocol and is connected to at least two routers in the network CIN, in order to be able to route from one to the other data streams destined for the terminals, in case of failure of one.

According to the invention, the network CIN also includes at least one controller OFC, connected to each of the switches and routers that it controls, according to the OpenFlow protocol. Thus, the streams may be routed in the network CIN using routing tables established and updated by the controller, and it is no longer necessary as in the LTE/EPC standard to establish IP tunnels so that streams between the PDN network and the terminals pass through the IP core network. The radio links, and terminal mobility between base stations, may, however, be managed, as in the IP core network in conformity with the LTE/EPC standard, by MME (Mobility Management Entity) equipment (not illustrated), connected to the base stations and to the controller OFC.

FIG. 2 presents an example of implementation of the method of control, according to one embodiment of the invention.

A single stream is illustrated in this example and for simplicity the method is described for this stream, but the method naturally applies to the processing of multiple streams at the same time.

During a step E100, the controller OFC assigns the router OFR2 to the router OFR1 as backup router. This may be done according to instructions received from another piece of equipment in the network CIN, or according to information already held by the controller OFC.

During steps E201 and E202, the controller OFC transmits to the PDN network an item of information relating to the assignment made during step E100, in order to influence the choice of data stream routings that will be performed by the PDN network in case of failure of the router OFR1.

More precisely, during step E201, the controller OFC transmits a BGP message to the router OFR1 including a determined priority value to be assigned to a route passing through OFR1, e.g. MED=3 (Multi-Exit Discriminator, RF04451, is a parameter used for discriminating between the entry/exit points between two neighboring autonomous networks, the lowest value indicating a higher priority). This message is encapsulated in a PacketOut OpenFlow packet. This message is decapsulated then transmitted by OFR1 to PE1 with the same value MED=3, even if PE1 and OFR1 do not form part of the same network.

Similarly, during step E202, the controller OFC transmits another BGP message to the router OFR2 including a determined priority value to be assigned to a route passing through OFR2 greater than that determined in the case of the router OFR1, e.g. MED=8. This message is encapsulated in a PacketOut OpenFlow packet. This message is decapsulated then transmitted by OFR2 to PE1 with the same value MED=8. Thus, the router PE1 will consider that the route to the router OFR1 has priority over that to the router OFR2, which means that it will use the route to the router OFR2 only if it cannot use that to the router OFR1, e.g. if the router PE1 detects a failure in the router OFR1.

As long as no failure affects the router OFR1, the router PE1 may transmit a stream of data ("data" in FIG. 2) to the router OFR1. According to the OpenFlow standard, if the data stream is not known to the router OFR1, it consults the controller OFC, as described in steps E301, E302 and E303.

During a step E301, the controller receives a PacketIn OpenFlow packet from the router OFR1, encapsulating the first packet of the unknown stream detected by the router OFR1.

During a step E302, the controller OFC decapsulates, identifies the stream, develops the processing rule, i.e. a stream routing rule, and re-encapsulates the packet in a PacketOut OpenFlow packet also including said rule.

During a step E303 the controller returns the packet to the router OFR1. Then the router OFR1 applies this rule for all the packets of the same stream, without seeking the controller.

The stream is then transmitted to the switch OFS1 in conformity with the processing rule received by the router OFR1. If the stream is unknown to the switch OFS1, it consults the controller OFC during Steps E304, E305 and E306 which are not described since they are similar to the previously described steps E301, E302 and E303.

The stream is then transmitted to the base station eNb1, optionally through one or more other switches, to which the terminal T1 receiving the stream (not illustrated in FIG. 2) is attached.

During a step E400, a failure affecting the router OFR1 is detected by the controller OFC, e.g. by means of a message conforming to the BFD (Bidirectional Forwarding Detection, RFC 5880) protocol.

Without waiting, the controller OFC then establishes the necessary processing rules in the equipment of the network CIN likely to receive the data streams transmitted by the PDN network to a router other than the failed router OFR1.

Thus, during a step E500, the controller OFC transmits to the router OFR2, which is the backup router for the router OFR1, all the PacketOut packets that it had previously sent to the router OFR1. In fact, it establishes the processing rule of the stream for the router OFR2 by copying that established for the router OFR1, which avoids OFR2 having to consult the controller OFC to know what to do with the stream.

The stream is then transmitted from the router OFR2 to the switch OFS1 in conformity with the processing rule received by the router OFR2 during step E500.

The stream is then transmitted from the switch OFS1 to the base station eNb1, to which the terminal T1 receiving the stream (not illustrated in FIG. 2) is attached.

The example only describes one stream but obviously generally applies to situations where a very large number of streams between the PDN network and the network CIN passes through the routers OFR1 and OFR2, typically several thousands, or even millions of streams, destined for thousands of different terminals. Thus there is a clear advantage in avoiding a very large number of consultation steps each using a PacketIn/PacketOut Open Flow exchange as described in steps E301, E302 and E303. Advantageously, when the streams transmitted by the router PE1 switch from the router OFR1 to the router OFR2, they are all replaced by a single step E500, according to the invention.

FIG. 2 only illustrates a single switch OFS1 but the example described above may easily be applied generally to multiple switches in the network CIN. If the streams in backup mode no longer pass through the switch OFS1 but through another switch OFS2, it is also possible and advantageous to avoid a very large number of PacketIn/PacketOut consultation steps by OFS2, such as those described for OFS1 in steps E304, E305 and E306, by replacing them with a single step similar to step E500, where the controller OFC transmits all the PacketOut packets that it has previously sent to the switch OFS1 to the switch OFS2 just once.

In relation to FIG. 3, an example is now presented of a control device, according to one aspect of the invention.

The control device 100 implements the method of control, in all the embodiments thereof that have just been described.

Such a device 100 may be implemented in a piece of equipment specialized in the control of routers and switches conforming to the OpenFlow protocol, such as a server. This device may also be hosted in MME equipment.

For example, the device 100 includes a processing unit 130, provided, for example, with a microprocessor µP, and controlled by a computer program 110, stored in a memory 120 and implementing the method of control according to the invention. On initialization, the code instructions of the computer program 110 are, for example, loaded into a RAM memory, before being executed by the processor of the processing unit 130.

Such a device 100 includes:
an establishing module 140, capable of establishing a processing rule (OFO) for a data stream, intended to be applied by a first router to this stream,
an assignment module 150, capable of assigning a second router as backup router for the first router,
a transmission module 160, capable of transmitting to an external packet data network an item of information (BGPMED3, BGPMED8) relating to the assignment of the second router as backup router for the first router,
a detection module 170, capable of detecting an event (BFD) relating to a failure of the first router,
a transmission module 180, capable of transmitting to the second router all (mOFO) the rules for processing data streams established for the first router and intended to be applied by the second router to these streams.

The modules described in relation to FIG. 3 may be hardware or software modules.

The examples of embodiment of the invention that have just been described are only some of the conceivable embodiments. They show that the invention can be used to control data streams by anticipation in an OpenFlow network, when these streams arrive at a backup router for which the rules for processing these streams have not been initially established in the event of the failure of the router that initially dealt with the streams.

Although the present disclosure has been described with reference to one or more examples, workers skilled in the art will recognize that changes may be made in form and detail without departing from the scope of the disclosure and/or the appended claims.

The invention claimed is:

1. A method of controlling an IP core network, said IP core network including at least one first and one second router connected to an external packet data network and a plurality of switches capable of connecting at least one base station of a network for access to the first and second routers,
said packet data network being capable of transmitting data streams through the IP core network destined for terminals attached to the at least one base station,
at least one data stream currently being routed between the external network and at least one terminal,
the method comprising the following acts:
at least one act of establishing a rule for processing one of said at least one streams by the first router,
assigning the second router as backup router for the first router;
transmitting to the external packet data network an item of information relating to said assignment of the backup router;
detecting an event relating to a failure of the first router; and
transmitting to the backup router at least one of the established processing rules, intended to be applied by the backup router.

2. The method of controlling as claimed in claim 1, including storing said at least one determined rule in a non-transitory computer-readable medium, the rule remaining stored as long at the at least one corresponding stream is currently being routed; and in which the act of transmitting the at least one rule to the backup router includes the stored rules.

3. The method of controlling as claimed in claim 1, in which the act of transmitting the at least one rule to the backup router is triggered by the act of detecting an event relating to a failure of the first router.

4. The method of controlling as claimed in claim 1, in which the at least one act of establishing a rule for processing a stream by the first router includes:
receiving a request from the first router, including an identifier of a stream;
determining a processing rule for the stream;
transmitting a response to the first router, including said rule,
wherein the act of transmitting at least one rule to the backup router includes the transmission of a plurality of said responses.

5. The method of controlling as claimed in claim 1, in which the act of transmitting an item of information relating to the assignment of the backup router includes transmitting a first request in conformity with the BGP protocol to the first router, including a first preference parameter, and transmitting a second request in conformity with the BGP protocol to the second router, including a second preference parameter of lower value than the first.

6. The method of controlling as claimed in claim 1, in which the event relating to a failure of the first router is obtaining an item of information on failure originating from the first router.

7. The method of controlling as claimed in claim 6, in which the failure information is obtained in a response conforming to the BFD Protocol.

8. The method of controlling as claimed in claim 1, in which the event relating to a failure of the first router is obtaining a plurality of requests for stream processing rules originating from the second router.

9. The method of controlling as claimed in claim 1, in which establishing the rules for processing data streams is in conformity with the OpenFlow protocol.

10. A device for controlling an IP core network, said IP core network including at least one first and one second router connected to an external packet data network and a plurality of switches capable of connecting at least one base station of a network for access to the first and second routers, said packet data network being capable of transmitting data streams through the IP core network destined for terminals attached to the at least one base station, at least one data stream currently being routed between the external network and at least one terminal, wherein the device comprises:

a non-transitory computer-readable medium storing instructions; and a processing unit configured by the instructions to perform acts comprising:

establishing a rule for processing one of said at least one streams by the first router, assigning the second router as backup router for the first router;

transmitting to the external packet data network an item of information relating to said assignment of the backup router;

detecting an event relating to a failure of the first router, and transmitting to the backup router at least one of the established processing rules, intended to be applied by the backup router.

11. A non-transitory computer-readable medium comprising a computer program stored thereon, which comprises instructions for implementing of controlling an IP core network, when the instructions are executed by a processing unit, said IP core network including at least one first and one second router connected to an external packet data network and a plurality of switches capable of connecting at least one base station of a network for access to the first and second routers, said packet data network being capable of transmitting data streams through the IP core network destined for terminals attached to the at least one base station, at least one data stream currently being routed between the external network and at least one terminal, wherein the instructions configure the processing unit to perform acts comprising:

at least one act of establishing a rule for processing one of said at least one streams by the first router, assigning the second router as backup router for the first router;

transmitting to the external packet data network an item of information relating to said assignment of the backup router;

detecting an event relating to a failure of the first router; and transmitting to the backup router at least one of the established processing rules, intended to be applied by the backup router.

* * * * *